US005802891A

United States Patent [19]

Kahara et al.

[11] Patent Number: 5,802,891

[45] Date of Patent: Sep. 8, 1998

[54] ANCHOR ASSEMBLY FOR MULTIPLE DRAWER LOCKING SYSTEM

[75] Inventors: Thomas Arthur Kahara, Fitchburg; Wayne Rodriques Crespo, Winchendon, both of Mass.

[73] Assignee: ESP Lock Products, Inc., Leominster, Mass.

[21] Appl. No.: 820,868

[22] Filed: Mar. 20, 1997

[51] Int. Cl.[6] .............................. E05B 65/44; F16B 27/00

[52] U.S. Cl. .................................. 70/79; 70/82; 312/333; 411/85

[58] Field of Search .................................. 70/78, 79, 82; 312/333; 411/84, 85, 966

[56] References Cited

U.S. PATENT DOCUMENTS 4,784,554 11/1988 Break .................................. 411/85 X
4,789,286 12/1988 Laput .................................. 411/84
5,411,356 5/1995 Travis et al. .............................. 411/85

*Primary Examiner*—Neill R. Wilson
*Attorney, Agent, or Firm*—Iandiorio & Teska

[57] ABSTRACT

An improved anchor assembly for a multiple drawer locking system having a “C” shaped lock bar with an access slot, the anchor assembly including an anchor having an anchor element for slidably mounting in the lock bar and a mounting device; a multi-faceted locking pin for engaging the mounting device and an indexing plate between the anchor element and the pin and including at least one anti-rotational element extending through the slot into the lock bar to prevent the anchor element from rotating and aligning with the slot; the indexing plate may also include a first indexing device and the locking pin may include a second indexing device for constraining the pin to lock with one of the facets in a predetermined position; the indexing plate may also include at least one gripping edge for gripping the lock bar to prevent sliding of the assembly.

21 Claims, 3 Drawing Sheets

ANCHOR ASSEMBLY FOR MULTIPLE DRAWER LOCKING SYSTEM

FIELD OF INVENTION

This invention relates to an improved anchor assembly for a multiple drawer locking system.

BACKGROUND OF INVENTION

One type of multiple drawer locking system uses a "C" shaped roll formed lock bar with a number of drawer locking pin assemblies. In one construction each assembly includes an anchor that has an anchor element or arm slidable within the "C" shape of the lock bar and a threaded upstanding stud. A hex shaped locking pin or other multi-faceted shape having a plurality of flats, has a threaded internal bore for engaging the stud. A locating washer is disposed between the pin and anchor plate and provides a locking tension to prevent the anchor and pin from coming loose. One problem with this approach is that when the hex pin is loosened to allow it to be repositioned along the roll bar the anchor arm can rotate, align with the opening in the roll bar and fall completely out of the roll bar. Another problem is that the hex pin when tightened into position can assume any orientation and not necessarily the desired one where a flat or face squarely confronts the drawer locking detent. This can result in the pin being jarred loose after repeated engagement.

SUMMARY OF INVENTION

It is therefore an object of this invention to provide an improved anchor assembly for a multiple drawer locking system.

It is a further object of this invention to provide such an anchor assembly in which the anchor arm cannot inadvertently align with the roll bar opening and fan out.

It is a further object of this invention to provide such an anchor assembly in which the pin is always compelled to have an engaging surface properly oriented with respect to the drawer locking device.

It is a further object of this invention to provide the anchor assembly securely grips the lock bar when installed and permits firm contact during relative movement when released.

This invention results from the realization that a more effective anchor assembly for a multiple drawer locking system can be achieved by restraining the anchor arm from aligning with the lock bar slot whereby it could accidently fall out, indexing the lock pin so that it is securable only with proper orientation of its flats and providing affirmative gripping of the lock bar by the anchor assembly.

This invention features an anchor assembly for a multiple drawer locking system having a "C" shaped lock bar with an access slot. The anchor assembly includes an anchor having an anchor element for slidably mounting in the lock bar and a mounting device. There is a multi-faceted locking pin for engaging the mounting device. An indexing plate between the element and the pin includes at least one anti-rotational element for extending through the slot into the lock bar to prevent the anchor element from rotating and aligning with the slot whereby it can fall out.

The invention also features an indexing plate including a first indexing device and a locking pin including a second indexing device for constraining the pin to lock with one of its facets in a predetermined position.

The invention also features an indexing plate with at least one gripping edge for gripping the lock bar to prevent sliding of the assembly.

In a preferred embodiment the gripping edge may be a knife edge and there may be a spring device for urging the gripping edge to release its grip on the lock bar when the lock pin is loosened. The anchor element may be elongate and have a width sized for withdrawal through the slot. The mounting device may include a stud which may be threaded. The locking pin may be hexagonal and may have internal threads for engaging with the stud threads. The indexing plate may include two anti-rotational elements. The first indexing device may include salient sections and the second indexing device recess sections. There may be one recess section associated with each facet of the locking pin.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
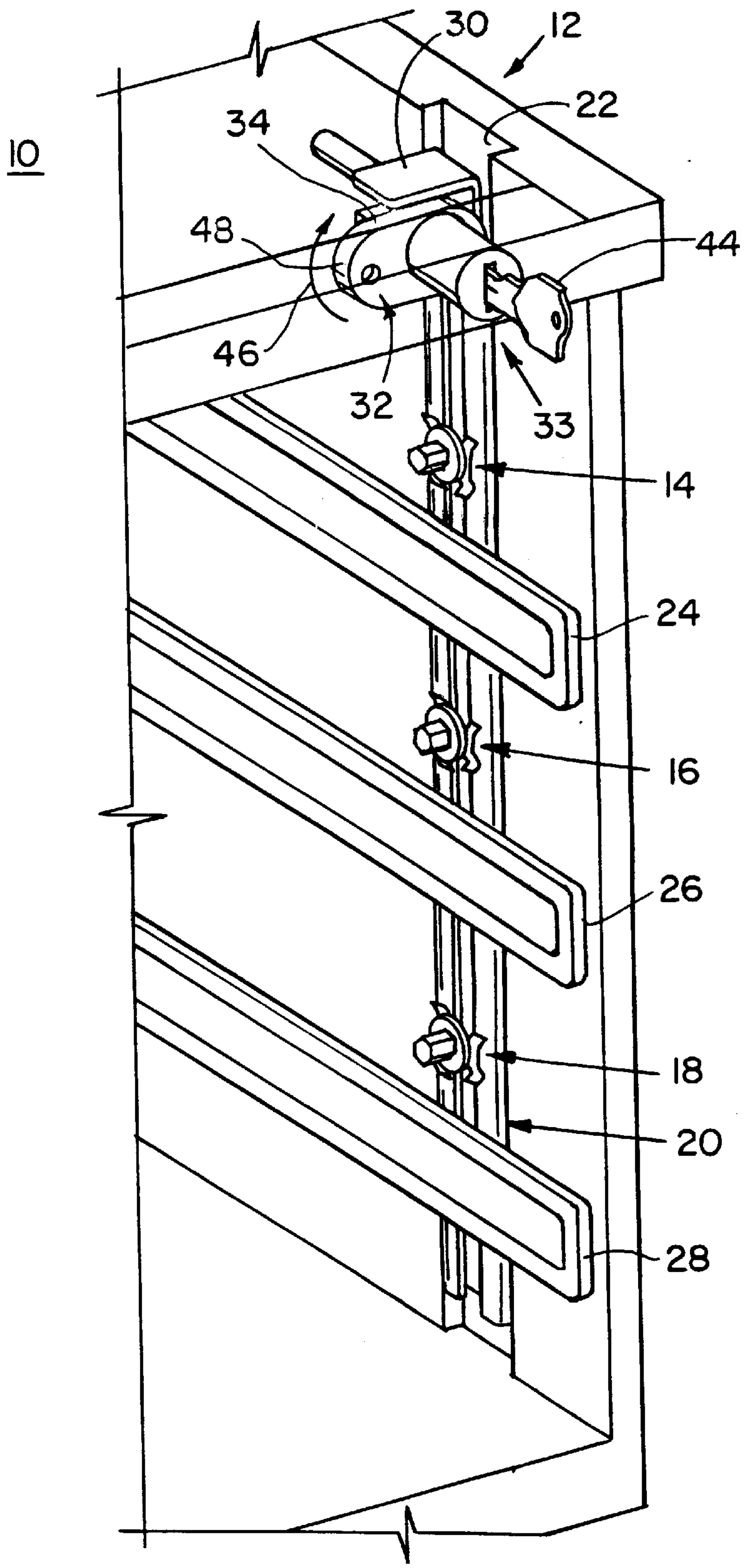
FIG. 1 is a diagrammatic three dimensional partially broken away view of a multiple drawer filing cabinet showing the anchor assembly according to this invention in a multiple drawer locking system.
Figure 2:
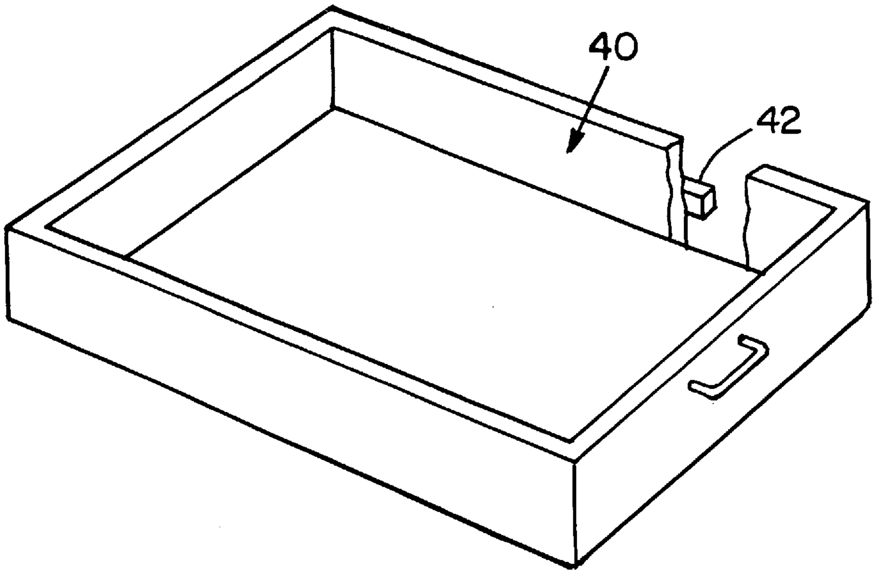
FIG. 2 is a diagrammatic three dimensional view of a drawer which may be used in the cabinet of FIG. 1 having a drawer locking detent or stop for engagement with an anchor assembly.

There is shown in FIG. 1 a multi-drawer cabinet 10 including a multiple drawer locking system 12 having a number of anchor assemblies 14, 16 and 18 according to this invention. Anchor assemblies 14, 16 and 18 are fixed onto "C" shaped lock bar 20 which is slidably mounted in groove 22 behind drawer slides 24, 26 and 28. The upper portion of lock bar 20 includes a follower tab 30 which rides on cam 32 of lock 33. In the lock position as shown lock bar 20 is down and follower 30 is resting on the edge 34 of cam 32. In this position each assembly 14, 16 and 18 blocks withdrawal of a drawer such as drawer 40, FIG. 2 by blocking drawer stop or detent 42 mounted on drawer 40 and each of the other detents on the other drawers which are in confronting contact with the associated anchor assemblies 16 and 18.

To unlock the multiple drawer locking system 12, key 44, FIG. 1 is rotated thereby rotating cam 32 in the direction indicated by arrow 46 so that surface 48 drives follower 30 downwardly thereby lowering with it each of anchor assemblies 14, 16 and 18 so that they are lowered out of the way of drawer stops 42 and the drawers can be withdrawn.

Figure 3:
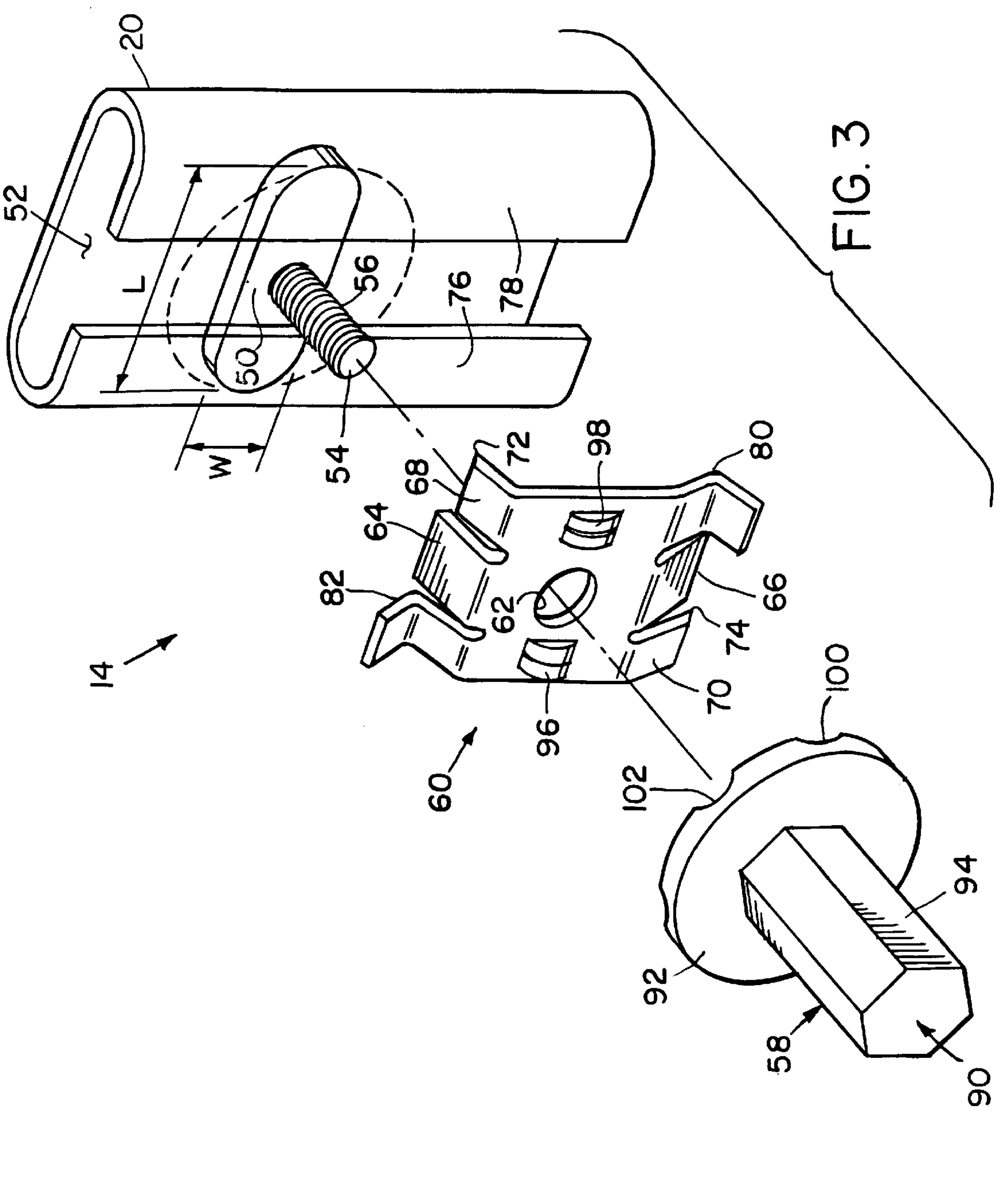
FIG. 3 is an exploded three dimensional diagrammatic view of one of the anchor assemblies of FIG. 1 according to this invention.

Each anchor assembly 14, 16 and 18 is exemplified by anchor assembly 14, FIG. 3, which includes an anchor arm or element 50 that is mounted in "C" shaped lock bar 20. Anchor element 50 is long enough in dimension L to bridge gap 52 so that it cannot be withdrawn when disposed across gap 52 but it is also narrow enough in its width dimension W so that when it is aligned with gap 52 it can be withdrawn. Stud 54 extends upwardly from anchor element 50 and may have threads 56 for engaging with similar threads in locking pin 58. Alternatively, stud 54 could be mounted in locking pin 58 and there could be threads provided in anchor element

50 or an entirely different type of engagement could be used. To tighten anchor element 50 in position in "C" shaped lock bar 20 it is simply needed to screw lock pin 58 onto threaded stud 54 and tighten it up partially then slide the assembly to the proper position and completely tighten locking pin 58 on stud 54.

In accordance with this invention between anchor element 50 and locking pin 58 there is disposed an indexing plate 60 with a hole 62 for accommodating stud 54. Indexing plate 60 also includes at least one anti-rotational element and in FIG. 3 actually includes two anti-rotational elements 64 and 66 which are bent down to extend into slot 52. The anti-rotational elements 64 and 66 extend deeply enough into slot 52 so that they prevent anchor element 50 from rotating to a position wherein it is aligned with slot 52 and can fall out of lock bar 20. Indexing plate 60 may also include one or more gripping edges 68, 70 which may include knife edges 72 and 74 to firmly grasp and even slightly embed themselves on the shoulders 76, 78 of lock bar 20 to firmly hold plate 60 in place when it is tightened down. Associated spring arms 80, 82 may also be provided to provide a counterforce so that when lock pin 58 is loosened on threaded stud 54 spring devices 80 and 82 urge knife edges 72 and 74 away from shoulder 76 and 78 so that the entire anchor assembly 14 can be moved to a new position without being entirely loosened: even though movable it maintains a snug gripping relationship with lock bar 20. Locking pin 58 includes a hexhead 90 which may have a plurality of facets, in this case specifically, it has a six sided hexagonal shape. Head 90 extends from flange or base 92 which is large enough to apply a force through indexing plate 60 to the shoulders of 76, 78 of lock bar 20. It is preferred that one of the facets, facet, flat or face 94 be oriented generally parallel to lock bar 20 and slot 52 so that it presents a full face to the drawer locking detent 42, FIG. 2, as illustrated by the orientation of the locking pins on each of the anchor assemblies 14, 16 and 18 in FIG. 1.

Figure 4:
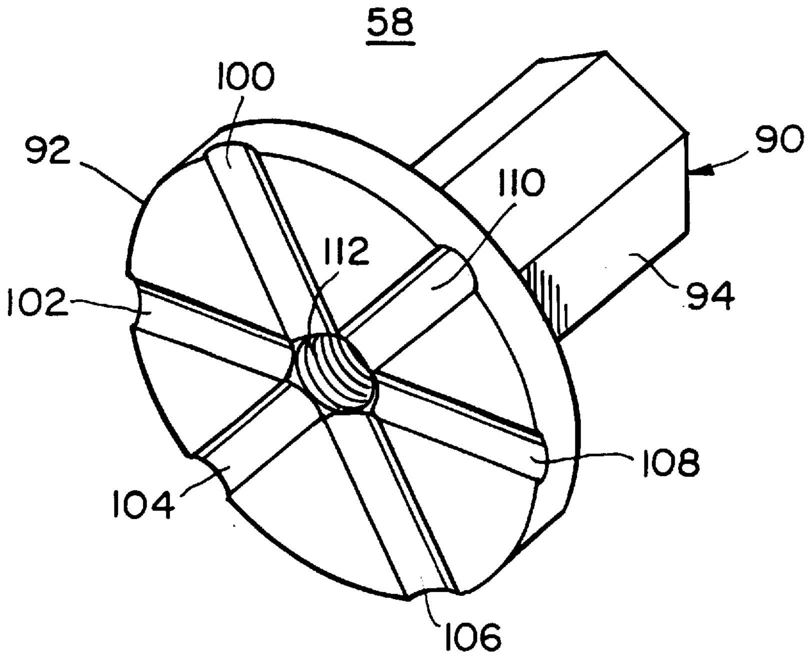
FIG. 4 is a three dimensional reverse view of the locking pin of FIG. 3.

To accomplish this one or more indexing devices such as bump 96 and if desirable second bump 98 may be provided on indexing plate 60. One or more compatible cups or recesses 100, 102 are provided on the underside of base 92 of locking pin 58 as shown more clearly in FIG. 4. In this case there are six recesses 100–110 one associated with each facet, flat or face of hexhead 90 but this is not a necessary limitation of the invention as one would be sufficient. The recesses are shown on base 92 and the bumps on indexing plate 60: the converse could be true or other indexing devices could be used. The threads 112 in locking pin 58 which engage with threads 56 on stud 54 are also shown clearly in FIG. 4. Upon assembly when locking pin 58 is mounted on stud 54 and rotated it eventually confronts indexing plate 60 and begins to squeeze it down against shoulder 76, 78, FIG. 3 of lock bar 20. When this happens the recesses 100–110 on the bottom of base 92 engage with bumps 96 and 98 on indexing plate 60 and cause a detenting action. When locking pin 58 comes to rest fully tightened, two opposing ones of the recesses 100–110 will be engaged with bumps 96 and 98 so that one of the flats of hexhead 90 will be aligned parallel with lock bar 20 and slot 52 so that it will directly confront drawer locking detent 42. In addition to giving a solid feel and a secure locking function the proper orienting of the flat also avoids skewed impacts with detent 42 that could tend to loosen lock pin 58 over time.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An improved anchor assembly for a multiple drawer locking system having a "C" shaped lock bar with an access slot, said anchor assembly comprising:

an anchor having an anchor element for slidably mounting in a lock bar and a mounting device;

a multifaceted locking pin for engaging said mounting device; and an indexing plate between said anchor element and said pin and including at least one anti-rotational element for extending through the slot into the lock bar to prevent said anchor element from rotating and aligning with the slot.

2. The anchor assembly of claim 1 in which said indexing plate includes a first indexing device and said locking pin includes a second indexing device for constraining said pin to lock with one of its facets in a predetermined position.

3. The anchor assembly of claim 1 in which said indexing plate includes at least one gripping edge for gripping the lock bar to preventing sliding of the assembly.

4. The anchor assembly of claim 3 in which said indexing plate includes a spring device for urging said gripping edge to release its grip on the lock bar when said lock pin is loosened.

5. The anchor assembly of claim 1 in which said anchor element is elongate and has a width sized for withdrawal through the slot.

6. The anchor assembly of claim 1 in which said mounting device includes a stud.

7. The anchor assembly of claim 6 in which said stud is threaded.

8. The anchor assembly of claim 1 in which said locking pin is hexagonal.

9. The anchor assembly of claim 6 in which said locking pin has internal threads for engaging with said stud.

10. The anchor assembly of claim 1 in which said indexing plate includes two anti-rotational elements.

11. The anchor assembly of claim 2 in which said first indexing device includes salient sections.

12. The anchor assembly of claim 11 in which said second indexing device includes recessed sections.

13. The anchor assembly of claim 12 in which there is one recess section associated with each facet of said locking pin.

14. The anchor assembly of claim 3 in which said gripping edge includes a knife edge.

15. An improved anchor assembly for a multiple drawer locking system having a "C" shaped lock bar with an access slot, said anchor assembly comprising:

an anchor having an anchor element for slidably mounting in a lock bar and a mounting device;

a multifaceted locking pin for engaging said mounting device; and an indexing plate between said anchor element and said pin and including a first indexing device on said indexing plate and a second indexing device on said locking pin for constraining said pin to lock with one of its facets in a predetermined position.

16. The anchor assembly of claim 15 in which said first indexing device includes salient sections.

17. The anchor assembly of claim 16 in which said second indexing device includes recessed sections.

18. The anchor assembly of claim 17 in which there is one recess section associated with each facet of said locking pin.

19. An improved anchor assembly for a multiple drawer locking system having a "C" shaped lock bar with an access slot, said anchor assembly comprising:

an anchor having an anchor element for slidably mounting in a lock bar and a mounting device;

a multifaceted locking pin for engaging said mounting device; and an indexing plate between said anchor element and said pin and including at least one gripping edge for gripping the lock bar to prevent sliding of the assembly.

20. The anchor assembly of claim 19 in which said indexing plate includes a spring device for urging said gripping edge to release its grip on the lock bar when said lock pin is loosened.

21. The anchor assembly of claim 19 in which said gripping edge includes a knife edge.

* * * * *